Feb. 25, 1964     H. LOEVENSTEIN     3,122,491
SEPARATING IRON FROM AQUEOUS ALUMINUM SALT SOLUTIONS
Original Filed May 24, 1955
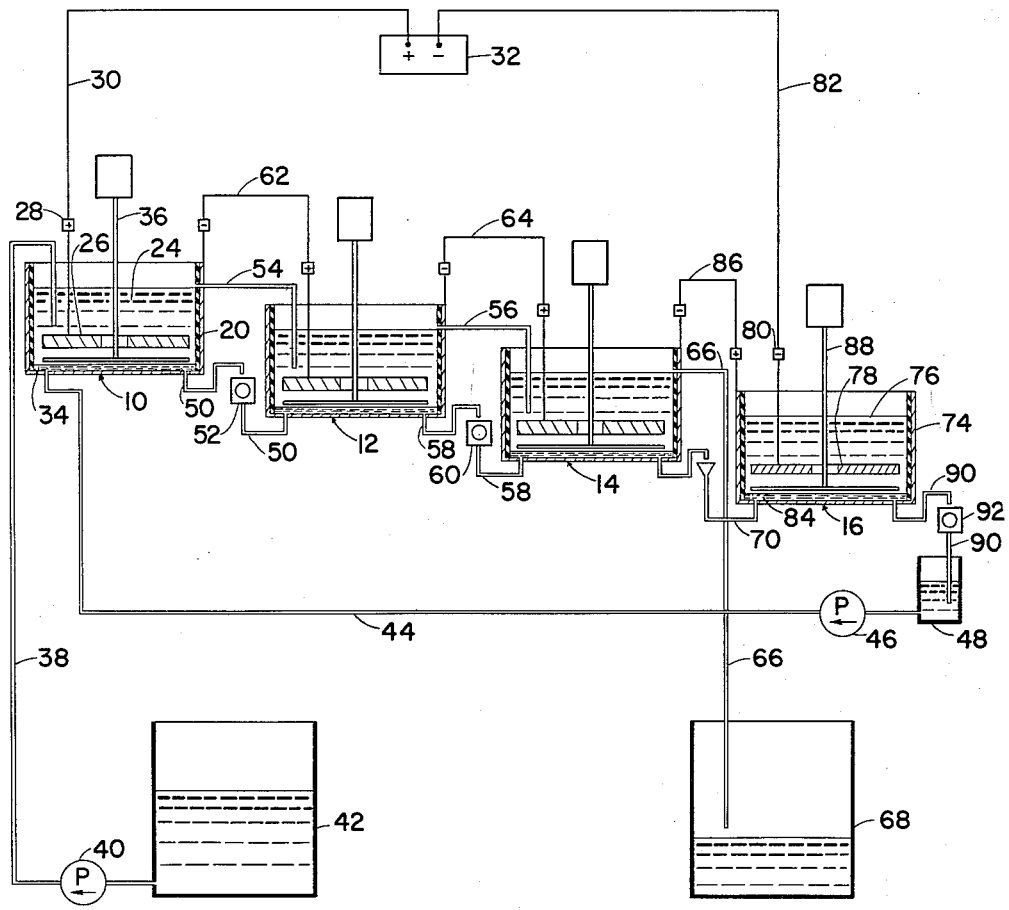
*INVENTOR.*
HIRSCH LOEVENSTEIN,
BY
ATTORNEY United States Patent Office 3,122,491
Patented Feb. 25, 1964

3,122,491
SEPARATING IRON FROM AQUEOUS ALUMINUM
SALT SOLUTIONS
Hirsch Loevenstein, The Dalles, Oreg., assignor to Harvey
Aluminum Incorporated, a corporation of California
Continuation of application Ser. No. 510,762, May 24,
1955. This application Dec. 15, 1960, Ser. No. 76,066
3 Claims. (Cl. 204—112)

This invention relates to a process of separating iron from aqueous aluminum sulfate solutions. It pertains particularly to a process for recovering excess iron from aqueous aluminum sulfate solutions resulting from the digestion of clay with sulfuric acid.

It has long been recognized that the alumina content of various widely distributed and inexpensive clays may be converted to aluminum sulfate by digesting the clay with sulfuric acid. However, the application of this process on a large commercial scale for the production of aluminum sulfate which is sufficiently pure for many of its industrial uses has been prevented heretofore by the fact that most of these clays, in addition to containing the desired alumina, also contain a large amount of oxides of iron.

During the digestion of the clays, the iron oxides are converted by the action of the sulfuric acid to ferrous sulfate, which contaminates the aluminum sulfate product unless steps are taken to remove it. Such removal is difficult however, and, although several procedures have been suggested for accomplishing it, up to the present time none has been acceptable.

Thus it has been proposed to remove the iron from the raw aluminum sulfate solution by treating the latter with excess clay. However, this does not remove a sufficient proportion of the iron and in addition requires a preliminary oxidation of any ferrous compounds present to the ferric state, as well as substantial dilution of the solution, both of these factors adding materially to the cost of the operation. Still further, part of the clay raw material is consumed in the iron removal step and hence is lost to production, thereby adding a further element of cost.

In another procedure, the raw aluminum sulfate solution is treated with aluminum trihydrate for the removal of iron. This effectuates a more efficient removal of the iron than does the treatment with clay, but is subject to the other disadvantages which attend the clay treatment. Also, aluminum trihydrate is relatively costly and can not always be produced at the plant in which the iron removal procedure is to be practiced.

In still other proposed processes the iron is removed from the aluminum sulfate liquor by the addition of various chemicals such as hydrated lime, potassium ferricyanide, potassium ferrocyanide, salts of manganese, etc., all of which have the common property of precipitating the iron from the solution. However, these methods are unsuitable for commercial application because some of them require that the ferrous iron first be oxidized to the ferric state; the reagents themselves are very costly; and principally, the reagent which has been used to precipitate the iron is itself difficult to remove.

Accordingly it is the general object of the present invention to provide a process for separating iron from the aluminum sulfate solutions obtained by digesting high iron clays with sulfuric acid.

It is another object of this invention to provide a process for separating iron, particularly excess iron, from aluminum sulfate solutions, which process is applicable to solutions of low pH thus permitting digestion of the clay to the point where nearly all of its content of alumina has dissolved.

It is another object of this invention to provide an electrolytic process for separating iron from aqueous aluminum sulfate solutions using a circulating iron-containing mercury electrode the iron content of which is maintained within predetermined limits so that the electrode retains its mobility irrespective of the fact that its content of amalgamated iron varies during the various stages of the process.

It is another object of this invention to provide an electrolytic process for separating iron from aqueous aluminum sulfate solutions which is characterized by a comparatively high current efficiency.

It is another object of this invention to provide an electrolytic process for separating iron from aqueous aluminum sulfate solutions which makes use of a circulating mercury electrode, but which requires a minimum amount of this relatively expensive material.

It is another object of this invention to provide an electrolytic process for separating iron from aqueous aluminum sulfate solutions which may be operated at low temperatures without the external application of heat.

The manner in which the foregoing and other objects of this invention are accomplished will be apparent from the accompanying specification and claims considered together with the drawing, the single figure of which consists of a schematic apparatus flow sheet, partly in section, illustrating a system which may be used for the electrolytic separation of iron from aluminum sulfate solutions in the manner described herein.

In general, the process of this invention comprises providing an aqueous solution of a water soluble salt of aluminum, particularly aluminum sulfate, which contains at least 0.1% by weight of a water soluble salt of iron, particularly ferrous sulfate, calculated as $Fe_2O_3$. This solution is electrolyzed between a lead or other suitable anode and a mercury cathode containing at least 0.02 but less than 0.5% by weight metallic iron.

During the electrolysis, the concentration of the iron salt in the aluminum sulfate solution is not permitted to drop below the stated level of at least 0.1% by weight, calculated as $Fe_2O_3$ and the metallic iron content of the mercury cathode is not permitted to increase above a level of 0.5% by weight. As the electrolysis proceeds, the ferrous ions present in the solution migrate to the mercury cathode and are released there as metallic iron, which dissolves in or combines with the mercury.

The resulting solution of iron in mercury is processed for the recovery of part of its iron content, precautions being taken to insure that the iron content of the mercury does not drop below 0.02% iron by weight. This may be accomplished by a reverse electrolytic procedure wherein the iron-mercury amalgam is made the anode of a suitable electrolytic cell. The electrolyzed mercury product, which still contains at least 0.02% metallic iron, then may be recirculated for use in the separation of a further quantity of iron from a further quantity of raw aluminum salt solution.

As has been indicated above, solutions of a variety of water soluble aluminum salts containing iron salts as contaminants may be processed by the presently described procedure. Suitable aluminum salt solutions thus include aqueous solutions of aluminum chloride, aluminum nitrate, and, particularly, aluminum sulfate. The solutions may be contaminated with iron in the form of its various water soluble salts, such as iron chloride, iron nitrate, or particularly iron sulfate.

The herein described procedure is particularly applicable, however, to the sulfuric acid solution of aluminum sulfate and ferrous sulfate which is obtained as a raw product from the digestion with sulfuric acid of clays containing a high proportion, i.e. more than 5% by weight, of iron, calculated as $Fe_2O_3$. In the preparation of such solutions the clay after crushing, calcining, and pulverizing is digested with sulfuric acid employed in amount sufficient to dissolve at least a major proportion of the alumina content of the clay. In a typical case, the aluminum sulfate solution is substantially saturated with aluminum sulfate and may contain variable amounts of iron sulfate, in some cases well above 2.0% by weight, calculated as $Fe_2O_3$. Its pH is substantially that of an aqueous aluminum sulfate solution containing little or no free sulfuric acid, i.e. from pH 0.3 to 3.0, usually about 2.0.

The foregoing or other suitable solution of water soluble aluminum salt contaminated with a water soluble iron salt is introduced into an electrolytic cell having a construction suitable for the electrolytic treatment of such solutions. One or more of these cells may be employed. Normally a number of iron removal cells may be combined in series with one iron recovery cell, in such a manner that the iron removed in the iron removal cells is nearly completely recovered in the iron recovery cell. The current efficiency in the iron removal cells depends on the amount of iron initially and finally present in the solution. That of the iron recovery cell, however, approaches 100% in nearly all cases.

In the system schematically outlined in the drawing there are three such cells 10, 12 and 14 for the separation of the iron from the solution and a fourth cell 16 for recovery of the iron as metallic iron. Cells 10, 12 and 14 may have substantially identical constructions, that of cell 10 being as follows:

The cell comprises an iron container 20, the sides of which preferably are rubber covered or otherwise electrically insulated. It is filled with an electrolyte comprising an aluminum sulfate solution 24.

An anode 26 is suspended in the electrolyte. It may be made of carbon, graphite or other material which is electrolytically inert to sulfate solutions but preferably is made of lead. The anode is connected to coupling 28 which in turn is connected through line 30 to the positive side of a supply of direct current 32 of sufficient strength to establish a cathodic current density of from 5 to 100, preferably 15 to 40 amperes per square foot of cathode surface.

The cathode 34 of the cell comprises a layer of mercury on the bottom thereof, spaced apart from the anode by a suitable distance. The mercury has a metallic iron content of at least 0.02% by weight, but not over 0.5% by weight to insure its mobility.

Although a variable amount of mercury may be employed as the cathode, it is preferred to use a minimum quantity of this costly material and it is a feature of the present invention that only enough need be employed to cover the bottom of the cell, for example a layer about 5 mm. thick. The cell then is provided with a motor driven agitator 36 which moves slowly during the period of electrolysis and agitates the mercury so that as the iron is liberated it is absorbed efficiently and uniformly in the mercury, and any mercury hydride which may be formed is decomposed.

For continuous operation, the raw aluminum sulfate solution is introduced continuously into cell 10 via conduit 38 fed by pump 40 from storage tank 42. Cathodic mercury is fed continuously to cell 10 via conduit 44 by mercury feed pump 46 from mercury sump 48. Partially used cathodic mercury is withdrawn continuously from cell 10 via conduit 50 which includes a mercury continuity breaker 52, for interrupting the circuit.

The partially electrolyzed solution overflows cell 10 and is introduced into the next cell 12 via conduit 54 while the cathodic mercury is introduced thereinto via conduit 50. Further electrolysis occurs in this cell, the electrolyzed solution overflowing and being transferred via conduit 56 into cell 14. The used cathodic mercury is introduced into cell 14 via conduit 58 which includes mercury continuity breaker 60.

As many iron removal cells of the type of cells 10, 12, 14 may be included in series circuit relationship to each other as may be desirable or necessary. Thus cells 10, 12 and 14 in the illustrated embodiment all are connected in series, current source 32 being connected through line 30 to anode 26 in cell 10, cathode 34 of cell 10 being connected through line 62 to the anode of cell 12; the cathode of cell 12 being connected through line 64 to the anode of cell 14; and the cathode of cell 14 being connected to the anode of cell 16.

As contrasted with iron removal cells 10, 12 and 14, cell 16 is an iron recovery cell having for its function the recovery of the iron which has been transferred by the electrolytic action of cells 10, 12 and 14 from the electrolyte contained therein to the circulating mercury cathode. Accordingly, the electrolyzed aluminum salt solution, which now has a greatly reduced content of iron, is transferred via conduit 66 to storage tank 68. The cathodic mercury, on the other hand, is transferred via conduit 70 directly into cell 16.

The construction of cell 16 is somewhat analogous to that of cells 10, 12 and 14. It includes a receptacle 74 which is made of iron and lined with an electrically insulating material such as rubber. Contained in the receptacle is a suitable electrolyte 76 which may be an aqueous solution containing ferrous chloride and calcium chloride.

Suspended in the electrolyte is a cathode 78 which may be made of carbon, graphite, or other material, but which preferably is made of iron. It is attached through connector 80 to line 82 which in turn is connected to the negative side of current source 32.

Cell 16 also contains a mercury electrode, which in this instance is the iron-containing mercury solution 84 introduced into the cell via conduit 70. This electrode is connected through line 86 to the cathode of cell 14 and accordingly acts as the anode.

It is of sufficient depth to cover the bottom of the cell and is agitated by the slowly moving motor driven agitator 88. It is withdrawn continuously into conduit 90, which includes the mercury continuity breaker 92 and which returns the mercury, now having a reduced content of iron, to mercury sump 48, ready for cycling back into cell 10 for treatment of a further quantity of raw aluminum salt solution.

The electrolytic operations occurring in the iron removal cells may be carried out at relatively low temperatures, for example, at temperatures of below 50° C. Accordingly, no external heat need be applied to these cells, the heat generated by the electrolysis being sufficient to establish a temperature suitable for efficient operation. However if desirable or necessary for a given purpose, as to accelerate the rate of reaction, the temperature of the electrolyte in the cells may be increased to a higher level by the application of heat from an external source. In general, the temperature should not be raised above about 80° C. to avoid rapid evaporation and overconcentration of the solution, resulting in precipitation of the aluminum sulfate. In the iron recovery cell a temperature of 60–80° C., obtained by external heating, is preferred.

To summarize the operation of the herein described electrolytic system:

Raw aluminum sulfate solution having a pH of between 0.3 and 3.0 which preferably is nearly saturated with aluminum sulfate and contains a variable amount of ferrous sulfate is pumped continuously from tank 42 into electrolytic cell 10. There a current density is applied from D.C. supply 32 which is sufficient to separate part of the iron as metallic iron at the circulating mercury cathode 34. This deposition of iron is selective, the aluminum remaining in solution as aluminum sulfate.

The aluminum sulfate electrolyte is withdrawn continuously from cell 10 and transferred via conduit 54 to cell 12 and thence by conduit 56 to cell 14. At the same time, the cathodic mercury is transferred continuously from cell 10 via conduit 50 to cell 12 and thence via conduit 58 to cell 14.

The electrolytic action occurring in the iron removal cells is controlled so that a major proportion of the iron is removed from the electrolyte. The resulting solution of aluminum sulfate thus may be substantially saturated with respect to aluminum sulfate. It may contain a limited amount, e.g. from 0.1 to 0.3%, of iron calculated as $Fe_2O_3$.

It is a particular feature of the presently described process, when operated in conjunction with a subsequent procedure for the precipitation of the aluminum sulfate content of the solution by the addition of sulfuric acid, that all of the iron need not be removed from the solution. This is in contrast to the procedures of the prior art in which iron is removed electrolytically from aluminum sulfate solutions to such an extent that only traces of iron remain in the solution. It also is in marked contrast to the procedure of the prior art for obtaining aluminum sulfate from its solutions by evaporation techniques.

In the latter process, if the aluminum sulfate after concentration to a substantial saturation contains 0.1% by weight iron calculated as $Fe_2O_3$ and is evaporated for the recovery of aluminum sulfate, the latter product will be contaminated with about 0.25% iron, calculated as $Fe_2O_3$. This iron content is so high as to make the aluminum sulfate unsuitable for many of its applications.

However, when the instant process is employed together with a procedure for recovering aluminum sulfate by precipitation with sulfuric acid, then the aluminum sulfate obtained from a solution contaminated with 0.1% iron calculated as $Fe_2O_3$ will contain less than 0.01% of that material and accordingly is well suited for all of its major applications.

Furthermore, the electrolytic operation is controlled so that the circulating mercury cathode, which originally contained at least 0.02% by weight metallic iron, does not at any time contain more than 0.5% by weight of that element. This is to insure its continued mobility so that it may be transferred from cell to cell. If more than the indicated amount of iron is present, then the resulting amalgam may become stiff and sticky so that it will not flow readily, as is required for the herein described operation.

The electrolyzed aluminum sulfate solution in cell 14 is transferred via line 66 to tank 68. The cathodic mercury, however, is transferred via line 70 into the iron recovery cell 16. Here it is made the anode 84 of a cell including the iron cathode 78 and an electrolyte 76 comprising an aqueous solution containing an iron salt such as ferrous chloride, and, if desired, another salt such as calcium chloride.

The electrolytic action taking place in cell 16 is continuous, the iron content of the mercury entering the cell being reduced from a maximum value of about 0.5% to a minimum value of not less than 0.02% by weight when leaving the cell. It is critical to the success of the presently described operation that the latter residual content of iron be maintained in the mercury. This is for the reason that if all of the iron is removed, then solution of the mercury content of anode 84 occurs. This results in the deposition of mercury salts on the anode surface; in migration of mercury to the cathode where it contaminates the deposit of electrolytic iron; and in consumption of part of the metallic mercury. These factors then ultimately will make impossible the successful continuous operation of the process.

Where, however, the iron content of the mercury anode in cell 16 is maintained at a level of at least 0.02% by weight, the mercury may be removed continuously from the cell through conduit 90 into mercury sump 48, whence it may be pumped by pump 46 through conduit 44 back into the first iron removal cell 10 for the processing of a further quantity of raw aluminum salt solution.

Also during the electrolysis of the aluminum salt solution the conditions are adjusted so that the concentration of iron in the solution at no time drops below a value of 0.1% by weight, calculated as $Fe_2O_3$. This is for the reason that if more iron is removed the current efficiency drops rapidly and the electrolytic removal of the iron becomes impractical.

The presently described process is illustrated further in the following examples wherein the proportions of the constituents are given in percent by weight.

EXAMPLE 1

A solution of aluminum sulfate contaminated with ferrous sulfate was introduced into the iron removal cell of an electrolytic system consisting of one iron removal cell such as is illustrated as cell 10 of the drawing and one iron recovery cell such as is illustrated as cell 16 of the drawing. The solution had been prepared by the digestion of a calcined, pulverized clay with 40% sulfuric acid. It contained a nearly saturated solution of aluminum sulfate and 0.83% iron calculated as $Fe_2O_3$. Its pH was 1.7.

The depth of the mercury in the two cells was 5 mm. A slowly moving agitator was employed for continuously stirring the mercury. The applied current density was 20 amperes per square foot of cathode surface and the current efficiency was 40.9%. The voltage of the iron removal cell was 4.2 volts and that of the iron recovery cell 0.9 volt. The temperature of the iron removal cell was 14° C.

The two cells were operated continuously for two hours during which time the iron content of the mercury entering the iron removal cell was 0.1% and that of the mercury leaving the iron removal cell was 0.34%. At the end of the operation, the aluminum sulfate solution contained but 0.34% iron calculated as $Fe_2O_3$, the balance having been deposited on the iron cathode of the iron recovery cell.

EXAMPLE 2

A solution of aluminum sulfate contaminated with ferrous sulfate and having a content and derivation substantially the same as that employed in Example 1 was introduced continuously into an electrolytic system consisting of three iron removal cells and one iron recovery cell such as are illustrated in the drawing. The depth of the mercury electrodes in the cells again was 5 mm. and the mercury was continuously agitated.

The applied current density was 20 amperes per square foot of cathode surface; the current efficiency, 28.7%. The electrolysis was continued for 14 hours. The voltage and temperatures of the cells at the end of the operation were: Cell 1—5.0 volts and 19° C.; cell 2—4.7 volts and 20° C.; cell 3—4.5 volts and 25° C.

The pH of the solution at the beginning of the operation was 1.6 and at the end of the operation, 1.2. The solution entering the first iron removal cell contained .79% iron calculated as $Fe_2O_3$. Upon leaving the third iron removal cell it contained only 0.19% iron, calculated as $Fe_2O_3$.

The iron content of the mercury entering the first iron removal cell varied between 0.12% iron and 0.04% iron, analyses being made at 3 hour intervals. The iron content of the mercury leaving the third iron removal cell varied from 0.30 to 0.44% Fe. This element therefore was removed effectively in the iron removal cell to produce an aluminum sulfate solution having a concentration of iron sufficiently low to permit the precipitation of substantially pure aluminum sulfate. It also produced a mercury electrode material having an iron concentration suitable for reintroduction into the first of the series of iron removal cells.

EXAMPLE 3

A further quantity of aluminum sulfate solution having a derivation and properties substantially the same as those set forth in Example 1 was introduced into a series of three iron removal cells and one iron recovery cell substantially the same as are depicted in the drawing.

This series of cells was operated continuously for six and one-half days. During the first 45 hours the cells were operated with a current density of only 10 amperes per square foot of cathode surface. The next 72 hours the cells operated with a current density of 20 amperes per square foot. During the last 39 hours they operated with a current density of 31 amperes per square foot.

During this operation the iron recovery cell was disconnected from time to time since the current efficiency of this cell was higher than the combined current efficiency of the three iron removal cells. To control this cell, mercury samples were taken at the outlet and analyzed. The iron content of the mercury then was permitted to increase to a value of about 0.05% before the cell was connected and to decrease to a value of about 0.02% before the cell was disconnected.

Table I

| Cathodic current density | 10 Amp./sq. ft. | 20 Amp./sq. ft. | 31 Amp./sq. ft. |
|---|---|---|---|
| Current efficiency_____percent__ | 23.4 | 24.4 | 21.5 |
| Iron content of aluminum sulfate solution entering cell 1 [1] percent__ | .78 | .82 | .82 |
| Iron content of aluminum sulfate solution leaving cell 3 [1] percent__ | .185 | .24 | .28 |
| Iron content of mercury entering cell 1 (average) [2]_____percent__ | .07 | .11 | .06 |
| Iron content of mercury leaving cell 3 (average) [2]_____percent__ | .36 | .42 | .32 |
| Terminal voltage: | | | |
| Cell 1_____ | 4.2 | 4.3 | 4.6 |
| Cell 2_____ | 4.0 | 4.1 | 4.8 |
| Cell 3_____ | 4.2 | 4.2 | 4.1 |
| Terminal temperature (° C.): | | | |
| Cell 1_____ | 19 | 25 | 26 |
| Cell 2_____ | 19 | 29 | 33 |
| Cell 3_____ | 19 | 30 | 36 |
| Terminal pH_____ | .7 | .5 | .4 |

[1] Calculated as $Fe_2O_3$.
[2] Calculated as Fe.

The foregoing results indicate clearly the effectiveness of the herein described procedure in separating iron from aluminum sulfate solutions by an electrolytic process operated at remarkably low temperatures and using an electrolyte having a pH as low as 0.4.

Accordingly it will be apparent that by the present invention I have provided a process for the separation of iron from solutions of aluminum salts contaminated with iron salts which is attended by several advantages of the greatest significance. It is applicable to solutions of low pH. It is operable with a high degree of current efficiency. A high current density may be employed. It makes use of a minimum amount of costly mercury. It may be operated at low temperatures without the application of external heat. It separates the iron efficiently, giving an aluminum sulfate product from which the aluminum sulfate may be precipitated in substantially pure form by the subsequent addition of sulfuric acid. Accordingly, it makes feasible a procedure for the commercial recovery of substantially pure aluminum sulfate from cheap, abundant clay raw materials containing as contaminants a high proportion of iron oxides, this result not having been attainable heretofore by any of the prior art procedures.

The instant application is a continuation of Serial No. 510,762, filed May 24, 1955, now abandoned.

Having thus described my invention in preferred embodiments, I claim:

1. The continuous process of separating iron from aqueous aluminum sulfate solutions which comprises providing an aqueous solution containing aluminum sulfate and ferrous sulfate which is substantially saturated with aluminum sulfate and which has a pH of 0.3 to 3.0, passing the solution through a series of iron removal electrolytic cells each of which contains an anode, passing a mercury cathode material containing from 0.02 to 0.5% by weight metallic iron through the series of iron removal cells, electrolyzing the solution in the iron removal cells while maintaining the concentration of ferrous sulfate in the solution at a level of about 0.1% to 0.3% by weight and the metallic iron content of the mercury cathode material at a level of not less than 0.02% nor more than 0.5%, thereby causing the separation of iron from the solution and its amalgamation with the mercury cathode, electrolyzing the resulting amalgam of metallic iron and mercury in an iron recovery electrolytic cell, using the amalgam as the anode, until its iron content has been reduced to a level not less than 0.02% by weight, cycling the resulting mercury cathode material of reduced iron content back to the electrolysis of a further quantity of aluminum sulfate solution, and following electrolysis, subjecting the aluminum sulfate solution to the action of sulphuric acid to precipitate aluminum sulfate.

2. The process of separating iron from aqueous solutions of aluminum salts which comprises providing a low pH aqueous solution of a water soluble aluminum salt containing a contaminating amount of a water soluble salt of iron, electrolyzing the aluminum salt solution using a cathode comprising mercury containing at least 0.02 but less than 0.5% by weight metallic iron, whereby to transfer iron from the aluminum salt solution to the mercury cathode, maintaining the electrolysis until the iron salt in the aluminum salt solution is reduced to from about 0.1% to about 0.3% by weight, during the electrolysis maintaining in the mercury cathode at least 0.02% but less than 0.5% by weight metallic iron by continuously removing mercury from the electrolysis, electrolyzing the mercury using the latter as the anode to remove therefrom the iron content in excess of said maintained amount, and returning the mercury to the aluminum salt electrolysis, and following electrolysis, subjecting the aluminum salt solution to the action of sulfuric acid to precipitate aluminum sulfate.

3. The process of claim 2 wherein the aluminum salt solution is aluminum sulfate solution having a pH of 0.3 to 3.0.

References Cited in the file of this patent
UNITED STATES PATENTS

| 1,900,996 | Palmaer | Mar. 14, 1933 |
| 1,970,973 | Palmaer | Aug. 21, 1934 |
| 2,389,691 | Schumacher et al. | Nov. 27, 1945 |